US007410596B2

(12) United States Patent
Verma et al.

(10) Patent No.: US 7,410,596 B2
(45) Date of Patent: Aug. 12, 2008

(54) CORROSION INHIBITING SOLUTIONS FOR ABSORPTION SYSTEMS

(75) Inventors: Shyam Kumar Verma, Gastonia, NC (US); George Robert Sandor, Gastonia, NC (US)

(73) Assignee: Rocky Research, Boulder City, NV (US)

(*) Notice: Subject to any disclaimer, the term of this patent is extended or adjusted under 35 U.S.C. 154(b) by 136 days.

(21) Appl. No.: 10/732,992

(22) Filed: Dec. 11, 2003

(65) Prior Publication Data

US 2004/0119042 A1    Jun. 24, 2004

Related U.S. Application Data

(63) Continuation of application No. 09/656,545, filed on Sep. 6, 2000, now Pat. No. 6,758,988.

(60) Provisional application No. 60/153,110, filed on Sep. 7, 1999.

(51) Int. Cl.
    *C09K 5/00* (2006.01)
(52) U.S. Cl. .................. 252/69; 62/112; 62/476
(58) Field of Classification Search ............ 252/67, 252/68, 69; 62/112, 476
    See application file for complete search history.

(56) References Cited

U.S. PATENT DOCUMENTS

| | | | |
|---|---|---|---|
| 2,725,364 A | 11/1955 | Dazzi | |
| 3,200,604 A * | 8/1965 | Greeley et al. ........... | 62/85 |
| 3,227,518 A | 1/1966 | Kennedy | |
| 3,424,601 A | 1/1969 | Hamilton | |
| 3,478,530 A | 11/1969 | Aronson | |
| 4,019,992 A | 4/1977 | Krueger | |
| 4,077,929 A | 3/1978 | Robinson | |
| 4,237,312 A | 12/1980 | Stapp | |
| 4,311,024 A | 1/1982 | Itoh et al. | |
| 4,563,253 A | 1/1986 | Leidheiser, Jr. et al. | |
| 4,612,378 A | 9/1986 | Bosshard et al. | |
| 4,743,393 A | 5/1988 | Hirozawa | |
| 4,963,290 A | 10/1990 | Bressan et al. | |
| 5,101,888 A | 4/1992 | Sprouse et al. | |
| 5,152,929 A | 10/1992 | Bentley et al. | |
| 5,186,009 A * | 2/1993 | Rockenfeller ........... | 62/112 |
| 5,206,404 A | 4/1993 | Gunkel et al. | |
| 5,547,600 A | 8/1996 | Downey | |
| 5,577,388 A * | 11/1996 | Chandler et al. ......... | 62/112 |
| 5,783,104 A * | 7/1998 | Kujak ..................... | 252/69 |
| 5,871,667 A * | 2/1999 | Cheng et al. ........ | 252/389.52 |
| 6,004,475 A | 12/1999 | Verma et al. | |
| 6,004,476 A * | 12/1999 | Verma et al. ............ | 252/69 |
| 6,024,892 A | 2/2000 | Verma et al. | |
| 6,033,595 A | 3/2000 | Verma et al. | |

FOREIGN PATENT DOCUMENTS

| | | |
|---|---|---|
| DE | 19623268 | 12/1996 |
| EP | 0248346 | 12/1987 |
| EP | 0329560 | 8/1989 |
| EP | 0573082 | 12/1993 |
| EP | 0611388 | 8/1994 |
| EP | 0741179 | 11/1996 |
| FR | 2505861 | 11/1982 |
| JP | 58224185 | 12/1983 |
| JP | 58224187 | 12/1983 |
| JP | 5993778 | 5/1984 |
| JP | 60118785 | 6/1985 |
| JP | 01174588 | * 7/1989 |
| JP | 1174588 | 7/1989 |
| JP | 1184287 | 7/1989 |
| JP | 285655 | 3/1990 |
| JP | 2147689 | 6/1990 |
| JP | 402296888 | * 12/1990 |
| JP | 7138559 | 5/1995 |
| JP | 875292 | 3/1996 |
| WO | 97/49842 | * 12/1997 |
| WO | WO 9749842 | 12/1997 |
| WO | WO 9803608 | 1/1998 |

OTHER PUBLICATIONS

Aramaki, K., et al. *Eac Sci Technol* 10(7):207-211 (1992).
Bartroff et al. "Inhibition of pitting corrosion by heteropoly acids" *Chemical Abstracts* Abstract No. 69499c 94(10):245 (Mar. 1981).
Basov et al. "Protection of metals from corrosion in acid organic media" *Chemical Abstracts* 90:172469 (1979).
Brahser, D., et al. "Sodium dodeca-molybdophosphate as a Corrosion Inhibitor in Aqueous Solution" *Br. Corros. J.* 4:74-79 (Mar. 1969).
Database WPI Section Ch, Week 199926. Derwent Publications Ltd., London, GB. JP 11106750 (Apr. 1999).
European Search Report corresponding to EP 03010754. Mailed Jul. 9, 2003.
European Search Report corresponding to EP 03010760. Mailed Jul. 9, 2003.
Gorski et al., "Brake Fluid" *Chemical Abstracts* 126(3) Abstract No. 34170 (Jan. 20, 1997).
Granese et al. "The inhibition action of heterocyclic nitrogen organic compounds on Fe and Steel in HCl media" *Corrosion Science* 33(9):1439-1453 (Sep. 1992).
Grnat & Hackh's Chemical Dictionary. Definition of "heteropoly acids" p. 282 (1987).
Japanese Patent Abstract 59117577 (1984).

(Continued)

*Primary Examiner*—Lorna M Douyon
*Assistant Examiner*—Amina Khan
(74) *Attorney, Agent, or Firm*—Knobbe, Martens, Olson & Bear LLP

(57) ABSTRACT

Anti-corrosion solutions and processes useful for refrigeration processes are proposed. Heteropoly complex anions of transitional metal elements can be added to an absorption solution which includes aqueous ammonia, alkali metal hydroxide and/or alkaline earth metal hydroxide, optionally in combination with transition metal compounds or compounds of the metallic elements of Groups IIIa to VIa of the Periodic Table of Elements to minimize corrosion of systems within which the solution is used.

8 Claims, No Drawings

OTHER PUBLICATIONS

Japanese Patent Abstract 59200769 (1984).
Japanese Patent Abstract 01155157 (1989).
Japanese Patent Abstract 2296888 (1990).
Japanese Patent Abstract 5228327 (1993).
Japanese Patent Abstract 5214326 (1993).
Japanese Patent Abstract 6221728 (1994).
Lomakina et al. "Heterpoloy Anions as Corrosion Inhibitors for Aluminum in High Temperature Water" *Werkstoffe Und Korrosion,De, Verlag Chemi GMBM Weinheim* 46(7):R111 (Jul. 1995).
Pak et al. "Solid-phase redox reaction of $12^{th}$ Series Heteropoly Acids" *Chemical Abstracts* AN 121:25617 69(4):617-619 (1994).
Patent Abstracts of Japan 007(285):C-201 (Dec. 1983 and JP 58 164792 A (Sep. 1983).
Pikel'nyi et al. "The Kinetics and Mechanism of Corrosion in the Presence of Heteropoly Compounds" *Protection of Metals* Plenum Publishing Co. New York. 30(4):385-386 (Jul. 1994).
Russian Patent Abstract 1685970 (1991).
Sastri et al. "Surface Analysis in Corrosion Inhibition Mechanisms" *Werkstoffe Und Korrosion* 39(2):7782 (Feb. 1987).
Simpson, C., "Second Generation Corrosion Inhibitors" *Polymer Paint Colour J* 185(4371):23-24 (1995).
Tanno et al. "The Corrosion of Carbon Steel in Lithium Bromide Solution at Moderate Temperatures" *Corrosion Science* 34(9):1441-14451 (Sep. 1993).
Tsygankova et al. *Zaschita Met alloy* 2777:344-347 (1991).
Tsygankova et al. "Protection of Steel by Hydroxyquinoline Films from Corrosion in Lithium Bromide Solutions" *Protection of Metals* 27(2):288-291 (Mar. 1991).
Tumurova, LV., *Zashch. Met* 26(3):437-439 (1990).
Weisstuch A., et al. "An Electrochemical Study of Heteropoly Molybdates as Cooling Water Corrosion Inhibitores" *Corrosion-Nace* 28(8):299-306 (Aug. 1972).
Zimina et al. "Synthesis and some physiochemical properties of complex halides of lithium and antimony" Chemical Abstracts, 74:106645 (1969).

* cited by examiner

CORROSION INHIBITING SOLUTIONS FOR ABSORPTION SYSTEMS

CROSS REFERENCE TO RELATED APPLICATIONS

This application is a continuation application of U.S. patent application Ser. No. 09/656,545; filed Sep. 6, 2000, now U.S. Pat No. 6,758,988, which claims priority to Provisional Application Ser. No. 60/153,110, filed Sep. 7, 1999, incorporated by reference in its entirety.

FIELD OF THE INVENTION

This invention relates generally to corrosion inhibiting solutions, and in particular to corrosion inhibiting absorption solutions which include corrosion inhibiting agents.

BACKGROUND OF THE INVENTION

Aqueous solutions of ammonia are useful as absorbent fluids in a variety of systems, such as absorption refrigeration machines, air conditioning systems, absorption heat pumps, reactifiers, and the like. Many of these systems also include heat exchangers. These systems typically operate under anaerobic conditions at temperatures of up to 450° F. Typically such solutions include ammonia in an amount ranging from about 1 to about 50 weight percent, based on the total weight of the solution.

Aqueous solutions of alkali metal and/or alkaline earth metal hydroxides, such as solutions of calcium-hydroxide, potassium hydroxide, cesium hydroxide and the like and mixtures thereof, are also used in absorbent fluids, for example in absorption cooling machines, chillers, and heat pumps. Typically such solutions include alkali metal and/or alkaline earth metal hydroxide in an amount ranging from about 20 to about 80 weight percent, based on the total weight of the solution.

Although these and other types of absorption solutions can be advantageous, aqueous ammonia, alkali metal hydroxides and/or alkaline-earth metal hydroxides can be corrosive toward the materials used to construct the machines. Such materials can include mild and stainless steel for containment components and copper or copper-nickel alloys for tube bundles (typically for machines in which alkali metal hydroxide and/or alkaline earth metal hydroxide solutions are used), among others.

In addition to the surface damage caused by corrosion, the corrosion reaction evolves hydrogen gas as a byproduct. Incondensibles in the form of atoms or ions can easily enter and diffuse into metals, resulting in the degradation of their mechanical properties under certain conditions.

The severity of corrosion can vary depending upon factors such as temperatures of the system, concentration of ammonia, alkali metal hydroxide and/or alkaline earth metal hydroxide in the absorption solution, metals used in the construction of the unit, the presence of air, and the like. For example, during use, the internal temperature of such machines can be high, typically up to about 450° F. and higher, depending on the type of the absorption cycle, which can increase the corrosive effect of the solution. As noted above, corrosion can generate significant amounts of hydrogen during machine operation, which can adversely impact the performance of the machine.

Various additives, such as lithium chromate, lithium nitrate, and lithium molybdate, have been proposed as corrosion inhibitors in absorption solutions. However, lithium chromate can raise environmental concerns, and its use is being phased out. Further, the level of chromate and its oxidation state must be carefully maintained. Chromate acts as an oxidant. Thus typically large quantities of chromate are added initially and must be replaced periodically to maintain the desired level of corrosion inhibition. If too little chromate is used, then it does not properly passivate the whole metal surface and pitting can result.

Lithium nitrate can potentially evolve ammonia, which can cause stress corrosion cracking of copper based alloys such as heat exchanger tubes. Lithium molybdate exhibits only limited solubility in ammonium, alkali metal hydroxide and/or alkaline earth metal hydroxide solutions. In addition, lithium molybdate is metastable in aqueous ammonium, alkali metal hydroxide, and/or alkaline earth metal hydroxide solutions. Thus it can be difficult to maintain in aqueous ammonia, alkali metal hydroxide, and/or alkaline earth metal hydroxide solutions and to maintain a constant concentration of molybdate ions in solution.

U.S. Pat. No. 5,342,578 reports the use of silicon compounds, in particular sodium silicate, as inhibitors for aqueous ammonium solutions. However, at a certain critical ammonium concentration, the effectiveness of such silicon compounds is diminished. Further, such silicon compounds can have limited solubility in an aqueous medium.

Pending U.S. patent application Ser. No. 08/882,771, filed Jun. 26, 1997, titled "Corrosion Inhibiting Solutions for Refrigeration Systems," is directed to the use of heteropoly complex anions of transitional elements as corrosion inhibition additives. Refrigeration absorption formulations which included heteropoly complex anions as a component exhibited improved corrosion inhibition properties and low generation of hydrogen gas that is evolved due to the corrosion reaction of alkali halide solutions with the materials of construction of the refrigeration machine. Pending U.S. patent application Ser. No. 08/896,110, filed Jul. 17, 1997, titled "Corrosion Inhibiting Solutions for Refrigeration Systems," is directed to the use of halide compounds of metallic elements of group Va, and demonstrated that alkali halide formulations containing these elements offer improved corrosion protection and low hydrogen as compared to conventional corrosion inhibitors.

SUMMARY OF THE INVENTION

The present invention provides aqueous ammonia solutions which are useful as absorption fluids for absorption machines. In-one aspect of this embodiment of the invention, the absorption solution contains at least one heteropoly complex anion of transition metal elements as a corrosion inhibitor. Alternatively the absorption solution contains a mixture of at least one heteropoly complex anion of transition metal elements with at least one other transition metal compound or salt as corrosion inhibitors. In yet another aspect of this embodiment of the invention, the absorption solution contains a mixture of at least one heteropoly complex anion with at least one compound or salt of the metallic elements of the groups IIIa to VIa of the Periodic Table of Elements as corrosion inhibitors. In yet another aspect of this embodiment of the invention, the solutions include at least one salt of a metallic element of Group Va of the Periodic Table of Elements, such as a halide or oxide thereof, and preferably antimony bromide ($SbBr_3$), as a corrosion inhibition additive.

Another embodiment of the invention provides alkali metal and/or alkaline earth metal hydroxide solutions, such as solutions of lithium hydroxide, calcium hydroxide, potassium hydroxide, sodium hydroxide, cesium hydroxide, and the like and mixtures thereof, which are useful as absorption fluids for absorption machines. In one aspect of this embodiment of the invention, the absorption solution contains at least one heteropoly complex anion of transition metal elements as a corrosion inhibiting additive.

Alternatively the absorption solution contains a mixture of at least one heteropoly complex anion of transition metal elements with at least one other transition metal compound or salt as corrosion inhibitors. In yet another aspect of this embodiment of the invention, the absorption solution contains a mixture of at least one heteropoly complex anion with at least one compound or salt of the metallic elements of the groups IIIa to VIa of the Periodic Table of Elements as corrosion inhibitors. In yet another aspect of this embodiment of the invention, the solutions include at least one salt of a metallic element of Group Va of the Periodic Table of Elements, such as a halide or oxide thereof, and preferably antimony halide, as a corrosion inhibition additive.

The compositions of the invention containing the above noted corrosion inhibitors provide improved corrosion protection for the materials of construction of the absorption machine. The formulations of this invention which contain the noted additives can also provide stable formulations, thereby providing aqueous ammonia, alkali metal hydroxide and/or alkaline earth metal hydroxide solutions having a sufficient concentration of the desired corrosion inhibiting agent. In addition, the solutions can reduce hydrogen generation and thus enhance performance of the absorption machines, due to reduced accumulation of non-condensable gas in the absorber. Still further, use of the absorption solutions in an absorption machine can result in a protective layer containing magnetite (iron oxide) formed on carbon steel. The inventors have found that protective layer which forms as a result of using the solutions of the invention can be more corrosion resistant than oxide layer formed in the presence of conventional corrosion inhibitors, such as lithium molybdate, in which magnetite film tends to be more amorphous and, less developed. The solutions are useful in any of the types of absorption machines known in the art, such as absorption refrigeration machines, chillers, air conditioning systems, heat exchangers, heat pump systems, and the like.

The present invention also provides processes for inhibiting corrosion of absorption machines, such as refrigeration machines, using the absorption solutions of the invention.

DETAILED DESCRIPTION OF THE PREFERRED EMBODIMENTS

The present invention will be described more fully hereinafter in connection with illustrative embodiments of the invention which are given so that the present disclosure will be thorough and complete and will fully convey the scope of the invention to those skilled in the art. However, it is to be understood that this invention may be embodied in many different forms and should not be construed as being limited to the specific embodiments described and illustrated herein. Although specific terms are used in the following description, these terms are merely for purposes of illustration and are not intended to define or limit the scope of the invention.

The heteropoly complex anions of transition metal elements can be generally described as coordination-type salts and free acids with a complex and high molecular weight anion. The heteropoly complex anions include as a ligand or complexing agent at least one transition metal atom which, as an ion in solution, exhibits corrosion inhibiting properties in absorption systems. The heteropoly complex anions useful in the solutions of the invention also are preferably substantially completely soluble in ammonia solution, so as to maximize the concentration of the corrosion inhibiting ions in solution. The heteropoly anions contain complexed transition metal atoms (such as Mo). Therefore, the dissolved heteropoly anions can provide a higher level of transition metal anions (Mo anions) in a solution, as compared to simple transition metal oxides, such as molybdates like lithium molybdate.

Any of the heteropoly complex anions known in the art can be used in the invention, including compounds described in the above-referenced U.S. patent application Ser. No. 08/882,771, filed Jun. 26, 1997, the entire disclosure of which is incorporated herein by reference. Such complexes can be generally represented by the following formulas:

$$[X_a M_b O_c]^{-n},$$

$$[X_a Z_d M_b O_c]^{-n},$$

$$[X_a Z_d M_b O_c H_e]^{-n},$$

$$[X_a M_b O_c(OH)_f]^{-n}, \text{ and}$$

$$[X_a Z_d M_b O_c(OH)_f]^{-n},$$

wherein:
X and Z are central heteroatoms from Groups I-VIII of the Periodic Table of Elements;
the value of a varies and is 1 or 2;
the value of d varies and is an integer from 0 to 4;
$M_b O_c$, $M_b O_c H_e$, and $M_b O_c(OH)_f$ are oxoanions in which M is a transition metal element; the value of b varies, depending upon the number of transition metal atoms present in the oxoanion and can be an integer from 5 to 22, preferably 6 to 12; the value of c varies, depending upon the number of oxygen atoms present in the oxoanion attached to the transition metal and also capable of forming unique structural groups with the central atoms, and is an integer from 20 to 70, preferably from 24 to 40; the value of e varies (for example in the reduced heteropolyanion, the value of e varies depending upon the reduction of the heteropolyanion) and is an integer from 0 to 6; and the value of f varies and is an integer from 0 to 3 and
n is the charge of the anion and is the sum of the charges on X, Z, M, O, H, and OH.

Although the above formulas are general representations of the heteropoly complex anions useful in the invention, as will be appreciated by the skilled artisan, other compounds can also be included. Also as these formulas represent, in some heteropoly complex anions, H atoms in addition to the O atoms have been reported. Any of the various heteropoly complex anions known in the art can be used in the invention, including compounds described by G. A. Tsigdinos, Topics Curr. Chem., vol. 76, 5-64 (1978) and D. L. Kepert, Comprehensive Inorganic Chemistry (A. F. Trofman et al.) Oxford: Pergamon Press, vol. 4, pp. 607 (1973), the entire disclosure of each of which is incorporated herein by reference.

With regard to the central or heteroatom X, over 40 different elements (both metals and nonmetals) from Periodic Groups I-VIII can function as central atoms in distinct heteropoly complex anions. For example, X can be an elements selected from Groups IVB, VB, VIB, VIIB, VIII, IB, IIB, IIIA, IVA, and VA of the Periodic Table of Elements. Exemplary central atoms include, but are not limited to, ions of phosphorus, silicon, manganese, arsenic, boron, iron, tellurium, copper, zinc, aluminum, tin, zirconium, titanium, vanadium, antimony, bismuth, chromium, gallium, germanium, and the like.

M is a 2-18 hexavalent transition metal element atom, which surrounds one or more central atoms X. The transition metal atom M is selected from those elements which as ions in solution provide corrosion inhibiting effect in absorption systems. Preferably the transition metal element M in the oxoanion is derived from molybdate or tungstate. Other transition metal elements can also be present, as represented in the formula as Z, such as but not limited to, an element selected from Groups IVB, VB, VIB, VIIB, VIII, IB, IIB, IIIA, IVA, and VA of the Periodic Table of Elements. Exemplary elements include without limitation manganese, cobalt, nickel, copper, zinc, vanadium, niobium, tantalum, gallium, germanium, arsenic, antimony, bismuth, tellurium, and the like and other transition elements.

Exemplary heteropoly complex anions include, but are not limited to, phosphomolybdates such as but not limited to, $[PMo_{12}O_{40}]^{-3}$, wherein $P^{+5}$ is the central atom or heteroatom, $[PMo_{10}V_2O_{40}]^{-5}$, and the liked silicon molybdates, such as but not limited to, $[SiMo_{11}NiO_{40}H_2]^{-6}$, wherein $Si^{+4}$ is the central atom; manganese molybdates, such as but not limited to, $[MnMo_9O_{32}]^{-6}$, wherein $Mn^{+4}$ is the central atom; silicon tungstates, such as but not limited to, $[SiW_{12}O_{40}]^{-4}$, wherein $Si^{+4}$ is the central atom; tellurium molybdates, such as but not limited to, $[TeMo_6O_{24}]^{-6}$, wherein $Te^{+6}$ is the central atom; arsenic molybdates, such as but not limited to, $[As_2Mo_{18}O_{62}]^{-6}$, wherein $As^{+5}$ is the central atom; manganese niobiates, such as but not limited to, $[MnNb12O_{36}]^{-12}$, wherein $Mn^{+4}$ is the central atom; and the like, and mixtures thereof. Currently preferred heteropoly complex anions are phosphomolybdates.

The heteropoly complex anions which have been structurally characterized can be divided into the broad groups, depending upon the heteroatom [X], transition metal atom [M] stoichiometry, and upon the coordination number of the heteroatom (that is, the number of points at which M is attached to the heteroatom in the complex). The heteropoly complex anions can be classified according to the ratio of the number of the central atoms to the peripheral molybdenum or other such atoms. For example, the different types of known heteropoly complex anions of molybdate show the following X:M ratio with one or more central atoms: X:M=1:12, 1:11, 1:10, 1:9, 1:6, 2:10, 2:17, 2:5, 4:12, 1m:6m (m unknown) and 1:1 heteropoly complex anions. The known tungstates include all of the above in addition to 2:18, 2:17 and 2:4:18.

In a preferred embodiment of the invention, the transition metal of the heteropoly complex anion is molybdenum or tungsten, and more preferably molybdenum. A particularly preferred solution includes the heteropoly complex anion $[PMo_{12}O_{40}]^{-3}$.

Transition metal compounds or salts useful in the invention are selected from compounds of transition metals which are capable of providing the transition metal element as ions in aqueous ammonia solution for complexing with the chosen heteropoly anion. The transition metal element of the transition metal compound can be the same or different from the transition metal of the heteropoly anion complex. Exemplary transition metal compounds or salts include nitrates, halides, oxides, and the like, preferably a halide, of the transition metal elements such as cobalt, nickel, tungsten, zirconium, manganese, chromium, and the like, and mixtures thereof.

The compounds or salts of the metallic elements of Groups IIIa to VIa of the Periodic Table of Elements are also selected from compounds which are capable of providing the metallic elements of Group IIIa to VIa as ions in ammonium solutions. Exemplary compounds or salts of the metallic elements of Groups IIIa to VIa include oxides, sulfides, halides, nitrates and the like, preferably a halide, of metallic elements of Group IIIa to VIa, such as antimony, germianium, and the like. For example, the above-referenced U.S. patent application Ser. No. 08/896,110, filed Jul. 17, 1997, describes halides of metallic elements of Group Va of the Periodic Table of Elements which can be useful in the invention, although other compounds can also be useful in this invention. Exemplary halides of Group Va metallic elements (i.e., arsenic, antimony, and bismuth) include antimony bromide, arsenic bromide, and bismuth bromide, and the like and mixtures thereof. The entire disclosure of pending U.S. application Ser. No. 08/896,110, filed Jul. 17, 1997, is incorporated herein by reference.

Salts of the Group Va metallic elements (i.e., arsenic, antimony, and bismuth) can include, for example, oxides and halides, such as bromide, chloride, or iodide, and preferably is bromide. Exemplary halides of Group Va metallic elements useful as corrosion inhibiting agents in the absorption solutions of the invention include antimony bromide ($SbBr_3$), arsenic bromide, and bismuth bromide, and the like and mixtures thereof. These Group Va metallic elements as ions in solution can exhibit corrosion inhibiting properties in absorption refrigeration systems.

The heteropoly complex anions, transition metal compounds, compounds of metallic elements of Groups IIIa and VIa, and salts of Group Va metallic elements are present in the compositions of the invention in amounts sufficient to provide the desired corrosion inhibiting effect. This amount can vary depending upon various factors, such as the solubility of the compounds in the absorption solution, the nature of the ions, temperatures in the machine, concentration of ammonia in aqueous solution, alkali metal hydroxides and/or alkaline metal hydroxides in solution, metals used in the construction of the unit, the presence of air, and the like. Preferably, the absorption solutions of the invention include at least one heteropoly complex, anion in an amount ranging from about 100 parts per million (ppm) to about 3000 ppm, more preferably about 200 ppm to about, 800 ppm. Transition metal compounds or compounds of the metallic elements of Group IIIa to VIa can be present in the solutions in amounts ranging from about 10 parts per million (ppm) to about 3000 ppm. Salts of metallic elements of Group Va can be present in an amount ranging from about 10 parts per million (ppm) to about 5000 ppm, and preferably from about 150 ppm to about 400 ppm. The corrosion inhibiting agents can also be useful in amounts outside of these ranges, so long as the agent is present in an amount sufficient to provide corrosion inhibition properties.

The aqueous ammonium absorption solution can include ammonia in conventional amounts. An exemplary solution includes ammonia in an amount from about 1 to about 50 weight percent, preferably about 5 to about 50 weight percent, based on the total weight of the solution, although as the skilled artisan will appreciate, amounts outside of this range can be used as well.

The alkali metal hydroxide and/or alkaline earth metal hydroxide absorption solutions can include alkali metal hydroxides, alkaline earth metal hydroxides and mixtures of alkali metal hydroxides and alkaline earth metal hydroxides in conventional amounts. An exemplary alkali metal and/or alkaline earth metal hydroxide absorption solution includes alkali metal and/or alkaline earth metal hydroxide in an amount from about 20 to about 80 weight percent, preferably about 10 to about 70 weight percent, based on the total weight of the solution, although as the skilled artisan will appreciate, amounts outside of this range can be used as well. The alkali metal and/or alkaline earth metal hydroxide can be, for example, calcium hydroxide, potassium hydroxide, cesium hydroxide and the like and mixtures thereof.

Further, the absorption solution can include lithium nitrate, molybdate and/or chromate in conventional amounts. Still further, the absorption solution can include halides, such as zinc halides, which can be particularly useful in high temperature applications (generally about 450° F. and higher). The zinc halides can be present in amounts up to about 50 weight percent.

The present invention also provides processes for inhibiting the corrosion of an absorption machine (such as a refrigeration machines) resulting from the presence of aqueous ammonium, alkali metal hydroxide and/or alkaline earth metal hydroxide absorbent solutions. In the process of the invention, the above described aqueous ammonia, alkali metal hydroxide and/or alkaline earth metal hydroxide solutions which include at least one heteropoly anion complex, or a mixture of the heteropoly anion complex with a transition metal compound or a compound of the metallic elements of Groups IIIa to VIa, or a halide of a metallic element of Group Va of the Periodic Table of Elements is circulated in an absorption machine under conditions and in amounts sufficient to provide a corrosion inhibiting effect. As the skilled artisan will appreciate, the environment or conditions, such as temperature and/or pressure, of different refrigeration machines can vary. Typically, the temperature of the machine can be as high as 550° F., and higher. The solutions are particularly advantageous for high temperature applications.

The present invention will be further illustrated by the following non-limiting examples.

EXAMPLE

Aqueous ammonium solutions (3%) having different corrosion inhibitors were prepared. Sodium chromate was the corrosion inhibitor in one solution. Sodium chromate is a corrosion inhibitor conventionally used in such machines. Solutions in accordance with the present invention including the heteropoly complex anion phosphomolybdic acid (PMA) and this complex in combination with an antimony halide [Note to Shyam—did you use] were also prepared.

The solutions were tested to determine the effectiveness of the corrosion inhibitors. Specifically tests were performed in a pressure vessel autoclave with temperature control of (+/− 2° F.). The solutions used in the tests were prepared as 3% ammonia concentration. The alkalinity of the solutions was adjusted with lithium hydroxide to control the solution pH at a level that optimized the performance of each chemical or generally accepted in the industry.

Pre-weighed metal coupons of C1018 carbon steel were placed in and above the solution contained in a 2 liter cylinder made of inconel-600 material which fits into the furnace. In order to eliminate the air from the headspace, the cylinder containing the solution was evacuated using a vacuum pump prior to starting the test. The solution was heated to 400° F. and held at this temperature for a period of 168 hours.

Upon completion, the test coupons were removed and cleaned by ASTM method G1-90. The corrosion rate was calculated from the weight loss. The level of hydrogen generated during the test was also determined at the end of each test. The results are set forth in Table 1 below.

TABLE 1

Corrosion rate of carbon steel in aqua-ammonia solution (3% ammonia solution) at 400° F. in one week.

| Additive | Corrosion rate (mils per year) for carbon steel in Liquid | Corrosion rate (mils per year) for carbon steel in Vapor | Hydrogen generated mg/in$^2$/week | Surface evaluation |
|---|---|---|---|---|
| Sodium chromate (2000 ppm) | 2.08 | 3.16 | 0.99 | Crevice and pitting corrosion in liquid or vapor |
| PMA (300 ppm) | 2.00 | 2.77 | 0.48 | No crevice or pitting corrosion. Excellent protection in liquid and vapor |
| PMA/Sb complex (400 ppm) | 0.25 | 0.20 | 0.93 | No crevice or pitting corrosion. Excellent protection in liquid and vapor |

As the data illustrates, the corrosion inhibitors of this invention resulted in excellent corrosion protection since the coupons from these tests showed no crevice and pitting corrosion. On the other hand, coupons from the chromate inhibited solution showed crevice and pitting corrosion. Also, the corrosion rate and hydrogen levels observed for the chromate inhibited solution were higher.

Specifically, in the presence of chromate inhibitor, the hydrogen level is 0.99 mg/in$^2$/week. Compared to sodium chromate, PMA corrosion inhibitor showed significant lowering of hydrogen generation and a small decrease in corrosion rate. The hydrogen level was reduced by almost 50 percent. The coupons exposed to solution containing PMA inhibitor showed excellent protection due to formation of a stable film. No crevice or pitting corrosion was observed.

When the PMA/antimony complex was used, corrosion rate was significantly diminished. The coupons showed a protective film formation. No crevice or pitting corrosion was observed. With this complex a lesser reduction in hydrogen was observed as compared to PMA alone.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An aqueous absorption solution consisting of water, at least one alkali metal hydroxide, alkaline earth metal hydroxide, or a mixture thereof, and at least one heteropoly complex anion of a transition metal element present in an amount sufficient to provide a corrosion inhibiting effect, the alkali metal hydroxide, alkaline earth metal hydroxide or mixture thereof is present in an amount from about 20 to about 80 weight percent, based on the total weight of the solution and wherein said at least one heteropoly complex anion is a compound selected from the group consisting of [XaMbOc]-n, [XaZdMbOc]-n, [XaZdMbOcHe]-n, [XaMbOc(OH)f]-n, [XaZdMbOc(OH)f]-n, and mixtures thereof, wherein:

X and Z are central heteroatoms selected from the group consisting of elements from Groups I-VIII of the Periodic Table of Elements; a is 1 or 2; d is an integer from 0 to 4; MbOc, MbOcHe, and MbOc(OH)f are oxoanions in which M is a transition metal element; b is an integer from 5 to 22; c is an integer from 20 to 70; e is an integer from 0 to 6; and f is an integer from 0 to 3; and n is the charge of the anion.

2. The solution of claim 1, wherein:

X is phosphorus, silicon, manganese, tellurium or arsenic; and

M is molybdenum or tungsten.

3. The solution of claim 1, wherein said at least one heteropoly complex anion is a phosphomolybdate of the formula $[PMo_{12}O_{40}]_{-3}$.

4. An aqueous absorption solution for refrigeration systems consisting of water, at least one alkali metal hydroxide, alkaline earth metal hydroxide, or a mixture thereof, at least one phosphomolybdate, and at least one transition metal halide corrosion inhibitor, said phosphomolybdate and said transition metal halide corrosion inhibitor present in an amount sufficient to provide a corrosion inhibiting effect.

5. The solution of claim 4, wherein said phosphomolybdate is $[PMo_{12}O_{40}]_{-3}$, and said transition metal halide corrosion inhibitor is cobalt halide or nickel halide.

6. The solution of claim 4, wherein said alkali metal hydroxide, alkaline earth metal hydroxide or mixture thereof is present in an amount from about 20 to about 80 weight percent, based on the total weight of the solution.

7. An absorption solution for refrigeration systems consisting of water, at least one alkali metal hydroxide, alkaline earth metal hydroxide, or a mixture thereof, at least one phosphomolybdate, and at least one halide corrosion inhibitor of the metallic elements of Group Va of the Periodic Table of Elements, said phosphomolybdate and said halide corrosion inhibitor present in an amount sufficient to provide a corrosion inhibiting effect.

8. The solution of claim 7, wherein said phosphomolybdate is $[PMo_{12}O_{40}]_{-3}$, and said halide corrosion inhibitor is antimony bromide ($SbBr_3$).

\* \* \* \* \*

UNITED STATES PATENT AND TRADEMARK OFFICE
CERTIFICATE OF CORRECTION

| | |
|---|---|
| PATENT NO. | : 7,410,596 B2 |
| APPLICATION NO. | : 10/732992 |
| DATED | : August 12, 2008 |
| INVENTOR(S) | : Verma et al. |

It is certified that error appears in the above-identified patent and that said Letters Patent is hereby corrected as shown below:

On the Title Page Item (56)

First page, second column (Foreign Patent Documents), line 11, above "JP 1184287 7/1989" please delete "JP 1174588 7/1989".

On the Title Page Item (56)

First page, second column (Other Publications), line 20, please delete "Grnat" and insert therefore, --Grant--.

On the Title Page Item (56)

Second page, first column (Other Publications), line 16, please delete "Heterpoly" and insert therefore, --"Heteropoly--.

At column 1, line 23, please delete "reactifiers," and insert therefore, --rectifiers,--.

At column 3, lines 5-17, please delete "Alternatively the.................inhibition additive." and insert the same at column 3, line 4, after "additive." as a continuation of the same paragraph.

UNITED STATES PATENT AND TRADEMARK OFFICE
CERTIFICATE OF CORRECTION

PATENT NO. : 7,410,596 B2
APPLICATION NO. : 10/732992
DATED : August 12, 2008
INVENTOR(S) : Verma et al.

It is certified that error appears in the above-identified patent and that said Letters Patent is hereby corrected as shown below:

At column 4, lines 41-42, please delete "n is.....OH." and insert the same at column 4, line 39 (approximately) after "and" as a continuation of the same paragraph.

At column 5, line 16, please delete "liked" and insert therefore, --like;--.

At column 5, line 26, please delete "niobiates," and insert therefore, --niobates,--.

At column 6, line 4, please delete "germianium," and insert therefore, --germanium,--.

Signed and Sealed this

Fourteenth Day of April, 2009

JOHN DOLL
*Acting Director of the United States Patent and Trademark Office*